United States Patent [19]

Tanaka

[11] Patent Number: 4,535,231
[45] Date of Patent: Aug. 13, 1985

[54] PHOTODETECTOR OUTPUT CIRCUIT

[75] Inventor: Shuhei Tanaka, Musashimurayama, Japan

[73] Assignee: Hitachi Denshi Kabushiki Kaisha, Tokyo, Japan

[21] Appl. No.: 400,450

[22] Filed: Jul. 21, 1982

[30] Foreign Application Priority Data

Jul. 24, 1981 [JP] Japan ................ 56-116326

[51] Int. Cl.³ ......................................... G01J 1/20
[52] U.S. Cl. ........................................ 250/201; 250/204
[58] Field of Search ................ 250/578, 201, 204; 354/402, 404–409; 356/1, 4

[56] References Cited

U.S. PATENT DOCUMENTS

| | | | |
|---|---|---|---|
| 4,252,425 | 2/1981 | Aohi et al. | 354/402 |
| 4,255,028 | 3/1981 | Aohi | 354/402 |
| 4,298,259 | 11/1981 | Aohi et al. | 354/402 |
| 4,329,577 | 5/1982 | Asano et al. | 250/201 |
| 4,377,342 | 3/1983 | Kawabata et al. | 250/204 |

Primary Examiner—David C. Nelms
Assistant Examiner—J. Gatto
Attorney, Agent, or Firm—Charles E. Pfund

[57] ABSTRACT

A photodetector output circuit comprises a plurality of adjacent photodetectors grouped into pairs having first and second photodetectors for generating signals indicative of levels of light falling thereon, a first shift register for receiving the signals from the first photodetectors in the pairs, a second shift register for receiving the signals from the second photodetectors in the pairs, and a pair of first and second sample and hold circuits for successively sampling and holding outputs from final stages of the first and second shift registers, respectively. A comparator receives as inputs outputs from the first and second sample and hold circuits for delivering out signals when the received inputs have a level difference of a predetermined value or higher. With this arrangement, the photodetector output circuit can produce digital signals indicative only of abrupt changes in the level of incident light and excludes any influence due to gradual light level variations which would result from shading.

5 Claims, 3 Drawing Figures

PHOTODETECTOR OUTPUT CIRCUIT

BACKGROUND OF THE INVENTION

The present invention relates to a photodetector output circuit for picking up analog image signals as digital signals Known automatic focusing control devices utilized in photographic cameras, television cameras and the like have a photoelectric transducer composed of a rectilinear array of adjacent photodetectors for picking up image signals, an analog-to-digital converter for converting the picked up image signals into digital signals, and a signal processing circuit for processing the digital signals into an output to control the optical system in the camera.

The optical image of an object as projected through the optical system onto the photoelectric transducer undergoes different light quantities due to aberration at the peripheral edge of the lens assembly of the optical system, and such differences in the amount of light tend to cause shading on the video signals generated by the photoelectric transducer. The shading then results in unwanted level variations, which in turn produce noise in the process of converting the analog image signals into the digital signals. The prior automatic focusing control devices incorporating the above signal output arrangement have thus suffered from the problem of inaccurate automatic focussing control.

SUMMARY OF THE INVENTION

It is an object of the present invention to provide a photodetector output circuit which will eliminate the foregoing conventional problem.

Another object of the present invention is to provide a photodetector output circuit for producing digital signals excluding influences due to gradual variations in incident light or noise components which would otherwise result as from shading, and having a resolution dependent on the number of photodetectors employed.

According to the present invention, a photodetector output circuit includes an array of photodetectors grouped into pairs each having first and second photodetectors, a pair of first and second sample and hold circuits for successively sampling and holding outputs supplied respectively from the first photodetectors and the second photodetectors in the pairs through a pair of first and second shift registers, and a comparator for comparing sampled and held signal levels from the first and second sample and hold circuits and for generating outputs when the level difference reaches or exceeds a predetermined value.

The above and other objects, features and advantages of the present invention will become more apparent from the following description when taken in conjunction with the accompanying drawings in which a preferred embodiment of the present invention is shown by way of illustrative example.

DESCRIPTION OF PREFERRED EMBODIMENT

Figure 1:
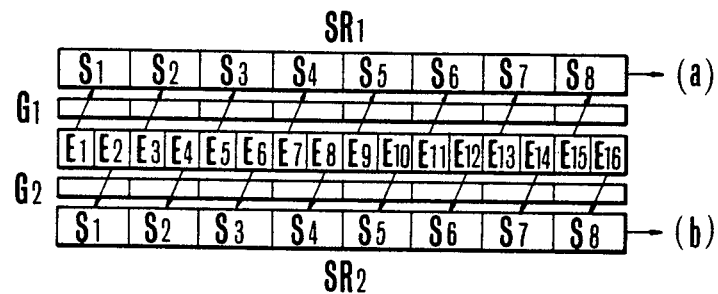
FIG. 1 is a block diagram of a photodetector assembly including an array of photodetectors and shift registers.

As shown in FIG. 1, a photodetector assembly includes a rectilinear array of photodetectors $E_1$ through $E_{16}$ responsive to incident nt light falling thereon in the pattern of an image for generating electrical output signals indicative of such an optical image.

The photodetectors $E_1$ through $E_{16}$ are grouped into adjacent pairs each composed of an odd-numbered photodetector and an even-numbered photodetector. Thus, the groups include a pair of photodetectors $E_1$, $E_2$, a pair of photodetectors $E_3$, $E_4$, ..., and a pair of photodetectors $E_{15}$, $E_{16}$. The odd-numbered photodetectors $E_1$, $E_3$, ..., $E_{15}$ in the pairs are coupled respectively to stages $S_1$ through $S_8$ of a first shift register $SR_1$ via a first gate group $G_1$ for periodically transferring outputs from the odd-numbered photodetectors through the first gate group $G_1$ respectively to the first shift register stages $S_1$ through $S_8$. Likewise, the even-numbered photodetectors $E_2$, $E_4$, ..., $E_{16}$ in the pairs are coupled via a second gate group $G_2$ respectively to stages $S_1$ through $S_8$ of a second shift register $SR_2$ for periodically transferring outputs from the even-numbered photodetectors via the first gate group $G_2$ to the second shift register stagers $S_1$ through $S_8$, respectively.

Each of the shift registers $SR_1$, $SR_2$ is supplied with shift pulses (not shown) for shifting out the contents in the stages $S_1$ through $S_8$ successively via the final stage $S_8$ within the period of transfer of each output from the photodetectors $E_1$ through $E_{16}$. Therefore, the final stage $S_8$ of the shift registers $SR_1$, $SR_2$ successively deliver out outputs (a), (b), respectively, which are dependent on the signals picked up by the photodetector groups $E_1$, $E_3$, ..., $E_{15}$, and $E_2$, $E_4$, ..., $E_{16}$.

Figure 2:
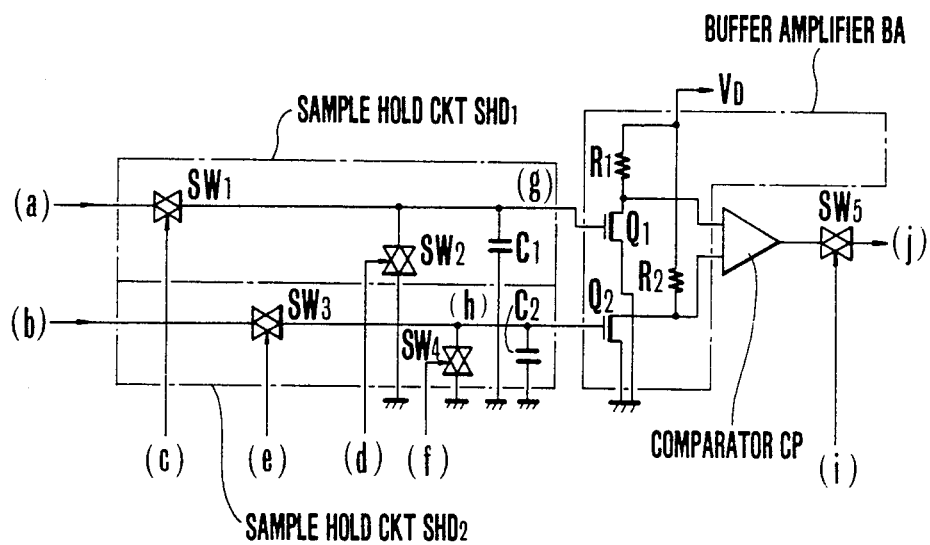
FIG. 2 is a circuit diagram of an output signal processing circuit connected to the photodetector assembly shown in FIG. 1 and having a pair of sample and hold circuits, a buffer amplifier, and a comparator.

The first and second gate groups $G_1$, $G_2$ should preferably be composed of analog switches capable of passing analog signals therethrough. The first and second shift registers $SR_1$, $SR_2$ should preferably be in the form of CCD (Charge-Coupled Device) shift registers which can shift analog signals while maintaining their levels against any variations which would otherwise be incorporated therein FIG. 2 shows an output signal processing circuit for processing output signals (a), (b) supplied from the first and second shift registers $SR_1$, $SR_2$. The output signal processing circuit includes a pair of first and second sample and hold circuit $SHD_1$, $SHD_2$ comprising switches $SW_1$, $SW_2$, a capacitor $C_1$, and switches $SW_3$, $SW_4$, a capacitor $C_2$, respectively, the switches $SW_1$ through $SW_4$ being preferably in the form of analog switches. The output signal processing circuit also includes a buffer amplifier BA composed of a pair of field-effect transistors $Q_1$, $Q_2$ of a high input impedance which have drains connected respectively through resistors $R_1$, $R_2$ to a power supply $V_D$. Signal samples held by the first and second sample and hold circuits $SHD_1$, $SHD_2$ are supplied to the gates of the field-effect transistors $Q_1$, $Q_2$. A comparator CP is receptive at its inputs of amplified outputs from the field-effect transistors $Q_1$, $Q_2$ of the buffer amplifier BA and produces an output signal which is fed out through a switch $SW_5$ coupled with the output of the comparator CP. The switch $SW_5$ should preferably be in the form of an analog switch as with the switches $SW_1$ through $SW_4$.

Figure 3:
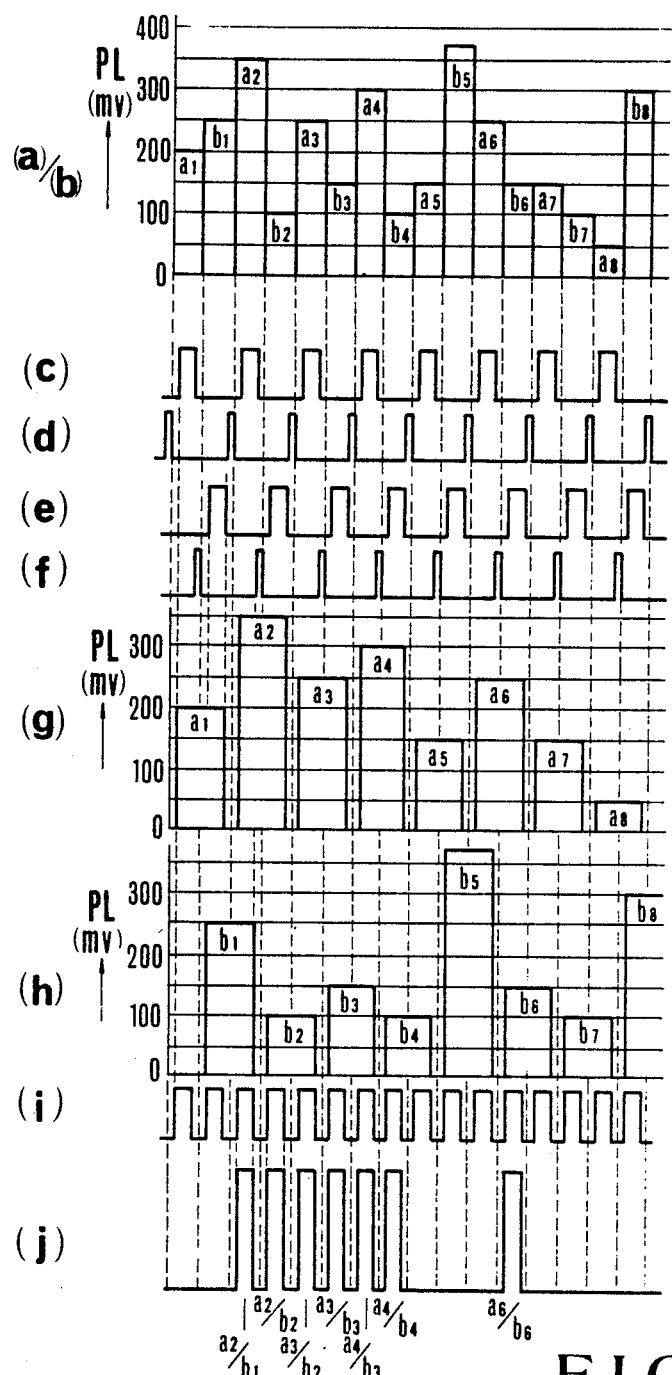
FIG. 3 is a timing chart illustrative of the waveforms of various signals generated in the output signal processing circuit shown in FIG. 2.

FIG. 3 illustrates the waveforms of signals produced in the output signal processing circuit shown in FIG. 2. The switches $SW_1$ and $SW_3$ in the output signal processing circuit are supplied with sampling pulses (c), (e), respectively, shown in FIG. 3, the switches $SW_2$, $SW_4$ with reset pulses (d), (f), and the switch $SW_2$ with gate pulses (i). The switches $SW_1$ through $SW_5$ will be turned on or open when supplied with these pulses.

In operation, the first and second shift registers $SR_1$, $SR_2$ successively and alternately deliver out signals (a), (b) indicative of optical image patterns falling on the array of photodetectors $E_1$ through $E_{16}$, the signals (a), (b) having various levels $a_1-a_8$ and $b_1-b_8$, respectively, which indicate optical intensities of the image patterns received, as shown at PL in FIG. 3. The switches $SW_1$, $SW_3$ are alternately turned on by the sampling pulses (c), (e) supplied in synchronism with the shift pulses applied to the shift registers $SR_1$, $SR_2$ to sample the signal levels $a_1-a_8$ and $b_1-b_8$ of the signals (a), (b). The samples thus picked up are successively held by the capacitors $C_1$, $C_2$, which are then reset when the switches $SW_2$, $SW_4$ are turned on in response to application of the reset pulses (d), (f) in synchronism with the shift pulses for the shift registers $SR_1$, $SR_2$. Therefore, the sampled levels held by the first and second sample and hold circuits $SHD_1$, $SHD_2$ vary as shown at (g), (h) respectively, in FIG. 3, these sampled levels overlapping in time. The sampled levels are then delivered out of the sample and hold circuits $SHD_1$, $SHD_2$ as serial outputs (g), (h).

The outputs (g), (h) are then supplied through the buffer amplifier BA to the inputs of the comparator CP, which produces an output when the level difference between the input signals therein exceeds a predetermined value, such as 100 mV, and the output (g) is higher in level than the output (h). The output signal from the comparator CP is picked up through the switch $SW_5$ as an output (j) shown in FIG. 3. The output (j) includes as many pulses as there are the photodetectors $E_1-E_{16}$, and thus is in the form of digital signals indicative of the level differences between the outputs from the pairs of the photodetctors $E_1$ through $E_{16}$. The pulses are of a high logic level when the level difference is 100 mV or higher, and of a low logic level when the level difference is lower than 100 mV.

Stated otherwise, the output (j) goes high only when each pair of photodetectors $E_1-E_{16}$ receives amounts of incident light which have a level difference equivalent to 100 mV or more. The succeeding signal processing therefore rejects any difference between incident light quantities which is indicative of an output level difference of below 100 mV, thus completely eliminating any adverse effects caused by shading or the like. Since such signal processing is based on the output (j) having as many pulses as there are the photodetectors, the signal processing can provide a resolution dependent on the number of photodetectors employed.

The photodetector output circuit of the invention therefore fails to detect gradual changes in the amount of incident light falling on the photodetectors, but can pick up abrupt light changes only, so that the construction is best suited for automatic focusing control and the like.

While in the illustrated embodiment the sixteen photodetectors $E_1$ through $E_{16}$ are included, as many photodetectors as desired may be incorporated dependent on the conditons of use, and the number of gates in the gate groups $G_1$, $G_2$ and the number of stages in the shift registers $SR_1$, $SR_2$ may be determined correspondingly. Furthermore, although the adjacent photodetectors are shown as being paired, any combination of two spaced photodetectors with a certain number of photodetectors interposed may be paired as desired.

The comparator CP may be arranged to produce an output of high logic level in response to a difference of desired magnitude between the inputs supplied, and also may be modified to generate an output of low logic level when the input difference exceeds a certain level. Alternatively, there may be used a comparator CP capable of producing an analog output dependent on a level difference when the latter exceeds a predetermined value, and an analog-to-digital converter may be included for converting such an analog output from the comparator into a digital signal composed of a plurality of bits. Where the comparator CP is of a high input impedance, the buffer amplifier BA may be dispensed with, and the switch $SW_5$ may also be omitted under certain conditions.

With the arrangement of the present invention, the photodetector output circuit can reject gradual variations in the amount of incident light which result from aberration of the edge of a lens or the like, and can produce signals indicative of abrupt changes in the quantity of incident light from an image to be picked up. Therefore, the photodetector output circuit can accurately detect images in automatic focusing control devices, for example, and can be incorpoated in a variety of devices which utilize digital image signals picked up.

Although a certain preferred embodiment has been shown and described, it should be understood that many changes and modifications may be made therein without departing from the scope of the appended claims.

What is claimed is:

1. A photodetector output circuit for an auto focussing camera comprising:
   a plurality of adjacent photodetectors grouped into pairs having first and second photodetectors for generating signals indicative of levels of light from an object to be photographed falling thereon;
   a first analog shift register for receiving the signals from said first photodetectors in said pairs;
   a second analog shift register for receiving the signals from said second photodetectors in said pairs;
   a pair of first and second sample and hold circuits for successively sampling and holding said analog outputs from final states of said first and second shift registers, respectively, and for successively resetting held samples after they have overlapped in time; and
   a comparator receptive as inputs of outputs from said first and second sample and hold circuits having gated output for delivering out digital logic signals representing when the received overlapped inputs have a level difference of a predetermined value or higher thereby providing comparator output which rejects gradual changes in incident light.

2. A photodetector output circuit according to claim 1, wherein each of said pairs of the photodetectors is composed of an odd-numbered photodetector and an adjacent even-numbered photodetector, and said first and second shift registors being receptive of outputs from said odd-numbered and even-numbered photodetectors, respectively, in said pairs.

3. A photodetector output circuit according to claim 1, wherein each of said first and second sample and hold circuits comprises a first switch for sampling the output from one of said first and second shift registers, a capacitor for holding the sampled output, and a second switch for resetting said capacitor to deliver the held sample to said comparator.

4. A photodetector output circuit according to claim 1, further including a buffer amplifier connected between said first and second sample and hold circuits and said comparator.

5. A photodetector output circuit according to claim 1, further including a switch connected to the output of said comparator for delivering out the signals from the output of the comparator.

* * * * *

UNITED STATES PATENT AND TRADEMARK OFFICE
CERTIFICATE OF CORRECTION

PATENT NO. : 4,535,231
DATED : August 13, 1985
INVENTOR(S) : Tanaka

It is certified that error appears in the above-identified patent and that said Letters Patent is hereby corrected as shown below:

Col. 1, l. 7:  insert --.-- after "signals"

Col. 2, l. 8:  delete "nt"

Col. 2, l. 28: change "stagers" to --stages--

Col. 2, l. 46: insert --.-- after "therein"

Col. 3, l. 6:  change "$SW_2$" to --$SW_5$--

Col. 3, l. 29: change "." to --,--

Col. 3, l. 67: change "conditons" to --conditions--

Col. 4, l. 29: change "incorpoated" to --incorporated--

Col. 4, l. 49: change "states" to --stages--

Col. 4, l. 64: change "registors" to --registers--

Signed and Sealed this

Eighteenth Day of March 1986

[SEAL]

*Attest:*

DONALD J. QUIGG

*Attesting Officer*  *Commissioner of Patents and Trademarks*